(12) United States Patent
Durej et al.

(10) Patent No.: US 6,667,690 B2
(45) Date of Patent: Dec. 23, 2003

(54) SYSTEM AND METHOD FOR CONFIGURATION OF HVAC NETWORK

(75) Inventors: Ronald G. Durej, Granby, CT (US); Richard P. Gonchar, Torrington, CT (US)

(73) Assignee: Carrier Corporation, Syracuse, NY (US)

( * ) Notice: Subject to any disclaimer, the term of this patent is extended or adjusted under 35 U.S.C. 154(b) by 185 days.

(21) Appl. No.: 10/051,996

(22) Filed: Jan. 22, 2002

(65) Prior Publication Data

US 2003/0137396 A1 Jul. 24, 2003

(51) Int. Cl.[7] ............................................. G08B 13/14
(52) U.S. Cl. .............................. 340/572.1; 340/310.01; 340/825.52; 340/3.1
(58) Field of Search .................. 340/572.1, 310.01, 340/3.1, 825.23, 5.1, 5.2, 10.1, 825.52, 310.06, 539.1

(56) References Cited

U.S. PATENT DOCUMENTS 5,495,722 A * 3/1996 Manson et al. ............... 62/125
5,565,855 A * 10/1996 Knibbe ....................... 340/3.51
5,579,993 A * 12/1996 Ahmed et al. ............... 236/49.3
5,818,347 A   10/1998 Dolan et al. .............. 340/825.52

* cited by examiner

Primary Examiner—Nina Tong (57) ABSTRACT

HVAC network devices are provided with radio frequency identification tags (RFID tags) which can be read by a read/write device. The read tag identification of each network device is stored in memory within the HVAC network device. A device capable of reading the RFID tags of the HVAC network devices will be used by a person to assign network addresses to each network device. In particular, the person will use information concerning the location of an HVAC network device to determine the network address that is to be assigned to the network device. The thus identified network address along with the tag identification is transmitted to a network controller for the communication network. The network controller will transmit a configuration message over the communication bus that will include the tag identification as well as the desired network address. The HVAC network device having the matching tag identification will respond to the configuration message from the network controller so as to thereby allow the desired network address to be downloaded to the particular HVAC network device.

15 Claims, 6 Drawing Sheets

SYSTEM AND METHOD FOR CONFIGURATION OF HVAC NETWORK

BACKGROUND OF THE INVENTION

This invention relates to the configuration of an HVAC communication network so as to facilitate communications between devices connected to the network. In particular this invention relates to how a device is identified and assigned a network address within the communication network.

The use of a communication network to convey HVAC control information over a common communication bus to devices connected to the bus is well known. Such networks are often used when one wishes to implement a hierarchical control of several heating or cooling devices. A central or master controller in such a hierarchical control will normally communicate with the devices connected thereto over a common control bus. In order to do so, the hierarchical control needs to be able to identify each device connected to the bus so that the particular device can be addressed by the central or master controller.

U.S. Pat. No. 5,818,347 entitled "Identification of HVAC Systems in a Communication Network" discloses a particular approach to assigning a network identification to an HVAC device. The device is assigned a network identification or network address by a hand held device which communicates with the HVAC device so as to thereby transfer the network identification to the HVAC device. The above system however requires that the network controller know in advance the network identification assigned to the HVAC device.

Other systems which identify an HVAC device within a communication network include providing buttons on either an HVAC zone controller or on a wall mounted device connected to the zone controller. Depression of such a button is interpreted as a signal over the network that the zone controller awaits the assignment of a network address. The technician performing such a network address assignment must usually walk from wherever the zone controller is located to a location where either a master controller or a computer is located that will assign a network address assignment to the zone controller. The person uses information as to the location of the zone controller to provide the network address to the master controller that will thereafter assign a network address to the zone controller.

SUMMARY OF THE INVENTION

It is an object of the invention to provide a system and method for quickly, easily and reliably assigning a network address to a zone controller or other HVAC network device.

An HVAC communication network includes a network controller node coupled to one or more down stream nodes by a distributed communication bus. Each down stream node preferably consists of some type of HVAC network device. At least some of these devices are provided with preprogrammed tags having tag identifications which can be read by a read/write device. The tag is preferably a radio frequency identification (RFID) tag. The tag identification for each device is stored in a nonvolatile memory within the HVAC network device. This is preferably done at some point during the manufacture of the network device.

In accordance with the invention, a technician will use a hand held device capable of reading the RFID tags of the HVAC network devices that have been connected to the distributed communication bus. The RFID tag on a particular HVAC network device will transmit its tag identification to the hand held device when the hand held device is in the vicinity of the particular device. The technician will access a floor plan identifying locations in the building where the HVAC network devices have been installed. This location information is used to identify a particular network address that is to be assigned to the HVAC network device in that particular location. This is preferably accomplished by accessing a data base that includes network addresses for particular locations. The thus identified network address along with the tag identification is transmitted to the network controller for the communication network. The network controller will transmit a configuration message over the communication bus that will include the tag identification as well as the desired network address. The HVAC network device having the matching tag identification will respond to the configuration message from the network controller so as to thereby allow the desired network address to be downloaded to the particular HVAC network device. Once the network address for the particular network device node has been established, then additional messages addressed to the particular HVAC network device can occur without use of the tag identification.

BRIEF DESCRIPTION OF THE DRAWINGS

The invention will become more apparent by reading a detailed description thereof in conjunction with the following drawings in which.

DESCRIPTION OF THE PREFERRED EMBODIMENT

Figure 1:
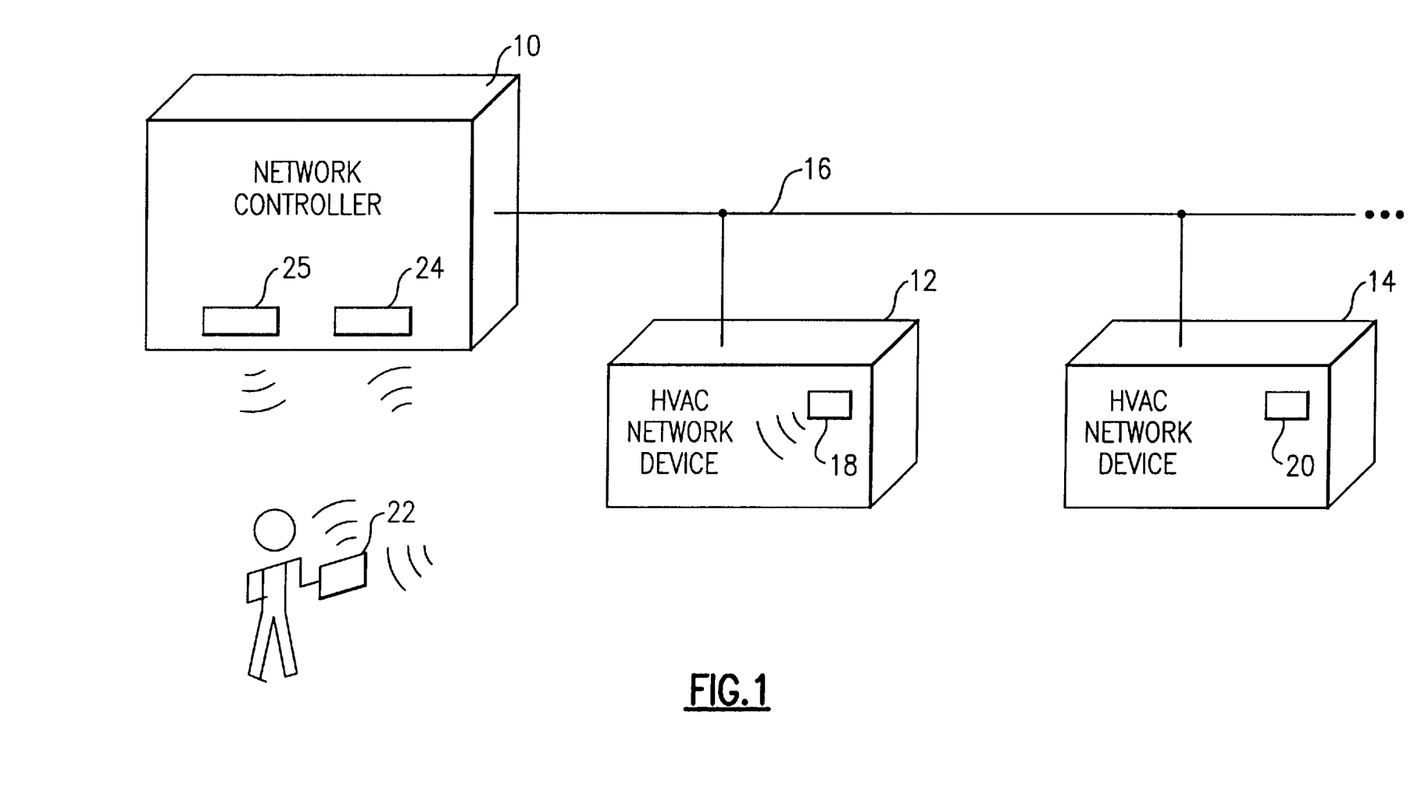
FIG. 1 illustrates a plurality of HVAC network devices connected by a common bus to a network controller.

Referring to FIG. 1, a network controller 10 is connected to HVAC network devices 12 and 14 by a communication bus 16. Each HVAC network device must have a network address which allows the network controller 10 to communicate with the particular device. The HVAC network devices may be any type of device connected to the communication bus 16 so as to communicate with the network controller or other HVAC network devices connected to the bus. This may include zone controllers for controlling air distribution systems regulating the flow of conditioned air to particular zones, HVAC devices or systems for providing conditioned air, monitoring devices such as temperature or humidity sensors connected to the bus, or any other communication device used within an HVAC network.

The HVAC network devices 12 and 14 each have a radio frequency identification (RFID) tag such as 18 and 20 which are preferably located on the device. The RFID tag 18 will activate and transmit its tag identification to a hand held device when the technician holding the device is within the transmitting range of the RFID tag 18. This tag identification can be any alpha numeric code as long as it is distinct from the alpha numeric codes produced by the RFID tags associated with other network devices. As will be explained in detail hereinafter, the received tag identification will be used to identify the network address that is to be assigned to the particular HVAC network device 12. This network address and the accompanying tag identification read from the RFID tag 18 will be transmitted to the network controller 10. The network controller 10 will thereafter assign the transmitted address to the particular HVAC network device 12 by matching the transmitted tag identification to the internally stored tag identification within the HVAC network device 12.

Referring to the network controller 10, it is to be noted that the network controller 10 includes a receiver 24 for receiving signals from the hand held device 22. The hand held device 22 preferably transmits an infrared signal to the receiver 24 which processes the transmitted infrared signals. The network controller also preferably includes a transmitter 25 for sending signals to the handheld device. The transmitter preferably transmits infrared signals which can be easily received and processed by the hand held device 22.

Figure 2:
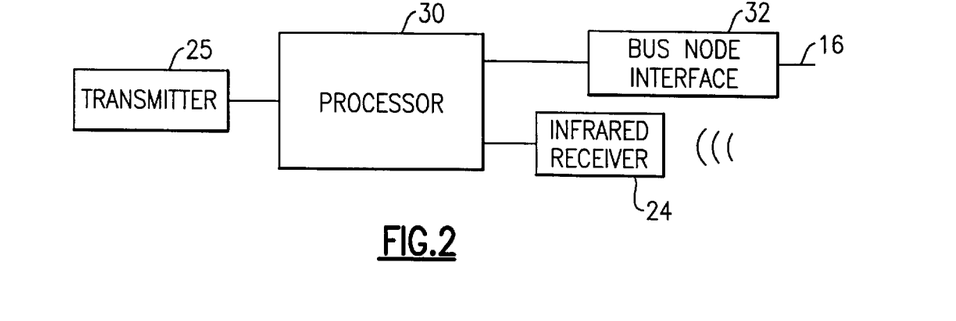
FIG. 2 illustrates the internal configuration of the network controller.

Referring now to FIG. 2, the internal configuration of the network controller 10 is seen to include a processor 30 connected to the infrared receiver 24 so as to process messages transmitted from the hand held device 22. The processor is also connected to the transmitter 25 so as to send messages to the hand held device. The processor 30 is also operative to send and receive signals to devices connected to the communication bus 16 via a bus node interface 32.

Figure 3:
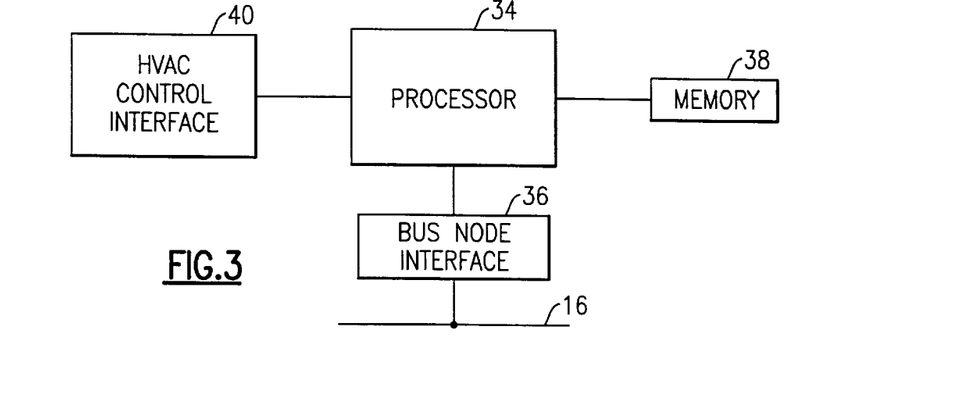
FIG. 3 illustrates the internal configuration of an HVAC network device of FIG. 1.

Referring now to FIG. 3, the internal configuration of an exemplary HVAC network device is shown. The internal configuration includes a processor 34 connected to a bus node interface 36 so as to receive and transmit signals over the communication bus 16. As will be explained in detail hereinafter, the processor receives a network address to be assigned to the particular node connection to the communication bus 16. The processor is also connected to a nonvolatile memory 38 which preferably stores the received network address. The processor 34 is also preferably connected to an HVAC control interface which could be any number of different types of control interfaces depending on the HVAC function that is to be controlled. In this regard the HVAC function downstream of the control interface could be dampers in an air distribution system, or it could be a heating or cooling device that is providing conditioned air to the air distribution system, or it could be any number of functional elements within an HVAC network device if the network device is itself an air conditioning unit.

Figure 4:
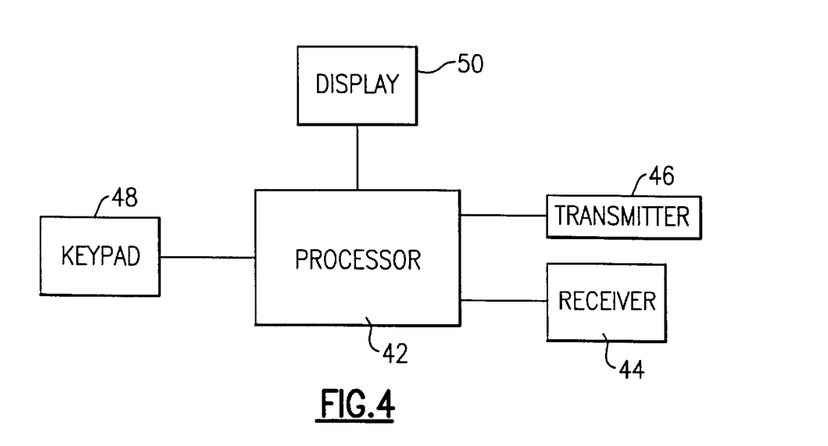
FIG. 4 illustrates the internal configuration of a hand held device that communicates with the network controller of FIG. 1.

Referring now to FIG. 4, the internal configuration of the hand held device 22 is shown. The internal configuration is seen to include a processor 42 connected to a receiver 44 which receives infrared signals from RFID tags. The receiver 44 also preferably receives infrared signals containing messages from the transmitter 25 of the network controller. The processor is also connected to an infrared transmitter 46 which transmits signals to the receiver 24 within the network controller 10. The processor 42 is also connected to a keypad 48 and a display 50 so as to allow data entering and display capabilities at the remote hand held device.

Figure 5:
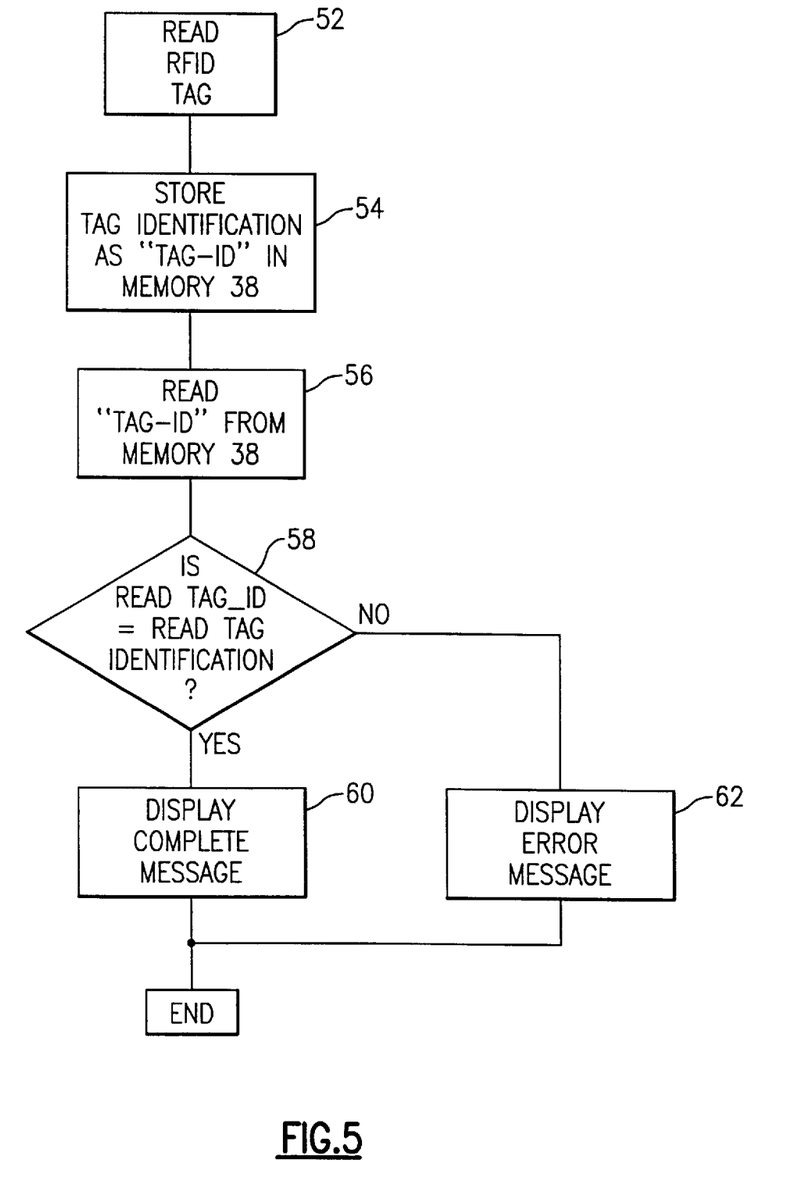
FIG. 5 illustrates a process whereby a tag identification for an HVAC network device is stored in the device.

Referring now to FIG. 5, the process whereby an HVAC network device is initially programmed so as to include a tag identification is shown. The process begins by reading an RFID tag that has been selected for the particular device in a step 52. This is accomplished by an infrared tag reader. The read tag identification is next communicated to the processor 34 within the network device. This may be done by a data entry device temporarily attached to the bus node interface 36 for the network device. On the other hand, the read tag identification could be communicated through another communication interface associated with the processor 34. In any event, the processor 34 is operative to store the read tag identification as TAG_ID in nonvolatile memory 38 in step 54. The processor thereafter checks to see that the read tag identification is properly stored by reading TAG_ID from memory in step 56 and inquiring as to whether the read value of TAG_ID is equal to the originally communicated tag identification read in step 52. The processor either proceeds to step 60 or step 62 and displays an appropriate message as to whether the read tag identification was stored accurately.

Figure 6:
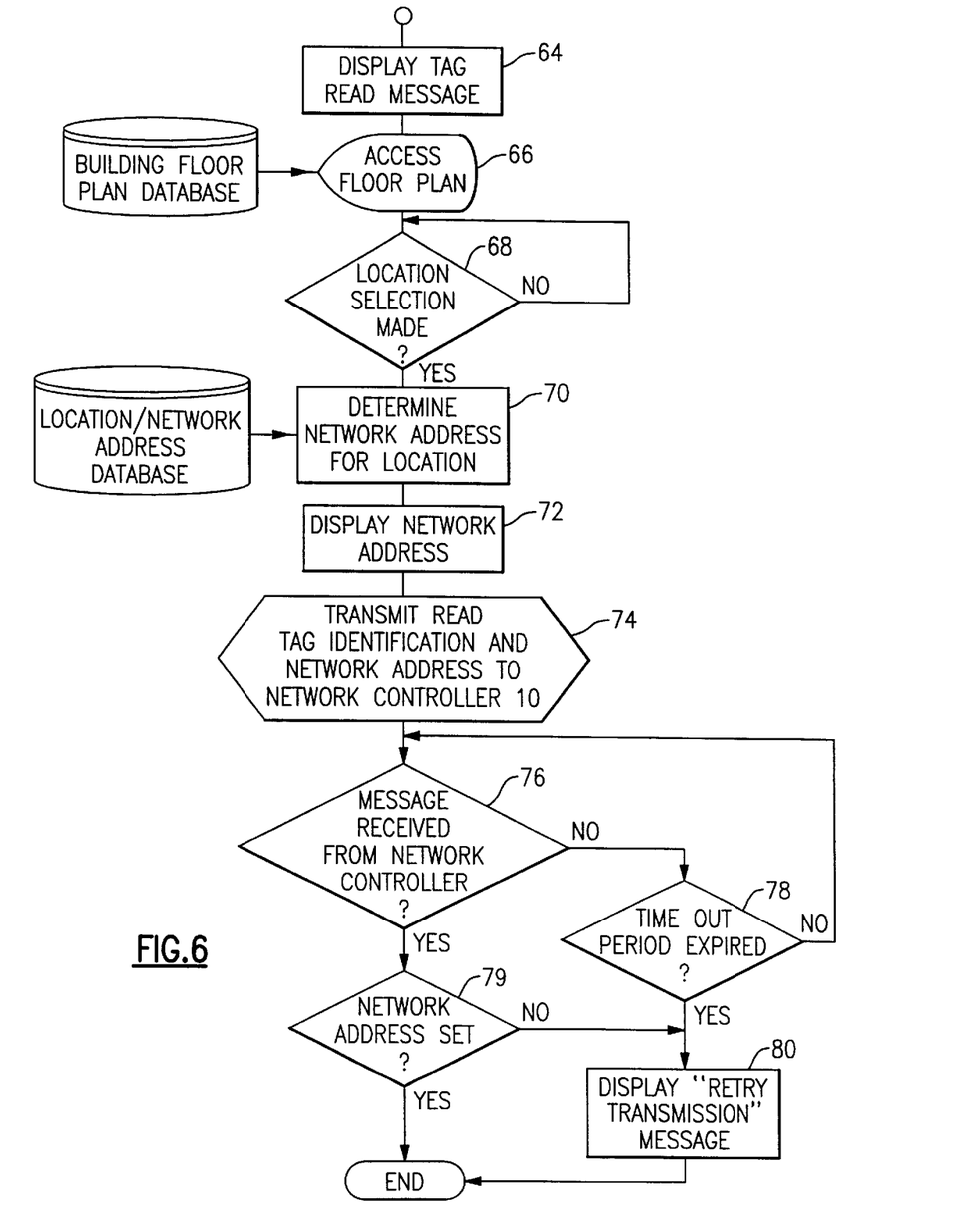
FIG. 6 is a process implemented by a hand held device wherein a network address is assigned to a particular HVAC network device in response to having read a tag on the device.

Referring now to FIG. 6, the process for assigning a network address to the tag identification stored in memory 38 is shown. The process begins when the hand held device 22 receives a signal from the RFID tag on a particular HVAC network device that is in the vicinity of the hand held device 22. In this regard, the person normally holding the hand held device will note the occurrence of a message on the display 50 of the hand held device indicating that an RFID tag has been read in a step 64. The hand held device may thereafter be used to display a floor plan of the building wherein various HVAC network devices are to be installed. The floor plan will indicate the various locations of the HVAC devices. This is done in a step 66 wherein the processor 42 within the hand held device is depicted as communicating with a floor plan database. It is to be noted that this database could either be stored in memory associated with the processor 42 in the hand held device or it could be stored in an off line storage device that can be accessed by the hand held device. It is furthermore to be appreciated that the building floor plan could merely be a document that the person operating the hand held device would consult to identify where the particular HVAC device is located on the floor plan. In any event, the processor 42 within the hand held device 22 next awaits a selection of the location in the building floor plan in a step 68. When a selection has been entered on the keypad 48 of the hand held device, then the hand held device will proceed to determine the network address for the particular identified or selected location. Specifically, the hand held device either communicates with another device having network addresses for particular identified locations or the hand held device itself has such information stored therein for local accessing. This is done in a step 70. The processor 42 within the hand held device may cause the determined network address to be displayed in a step 72 or it may proceed directly from step 70 to step 74 without such a display.

Referring to step 74, the processor 42 preferably awaits a command entered at the keypad 48 of the hand held device to transmit both the tag identification of the read RFID tag and the network address to the network controller 10. It is to be understood that the transmission of the tag identification of the read RFID tag and the network address is preferably accomplished through the transmitter 46 which is an infrared transmitter in the preferred embodiment. The processor 42 within the hand held device thereafter awaits confirmation that the network controller 10 has been successfully received by the network controller 10. This will preferably be accomplished by a confirmation transmitted back to the hand held device 22 from the network controller 10. The processor proceeds to exit from the process of FIG. 6 in the event that a message is received. In the event that a message is not received within an appropriate period of time defined in a step 78, then the processor proceeds to display a "retry transmission" message in a step 80.

Figure 7:
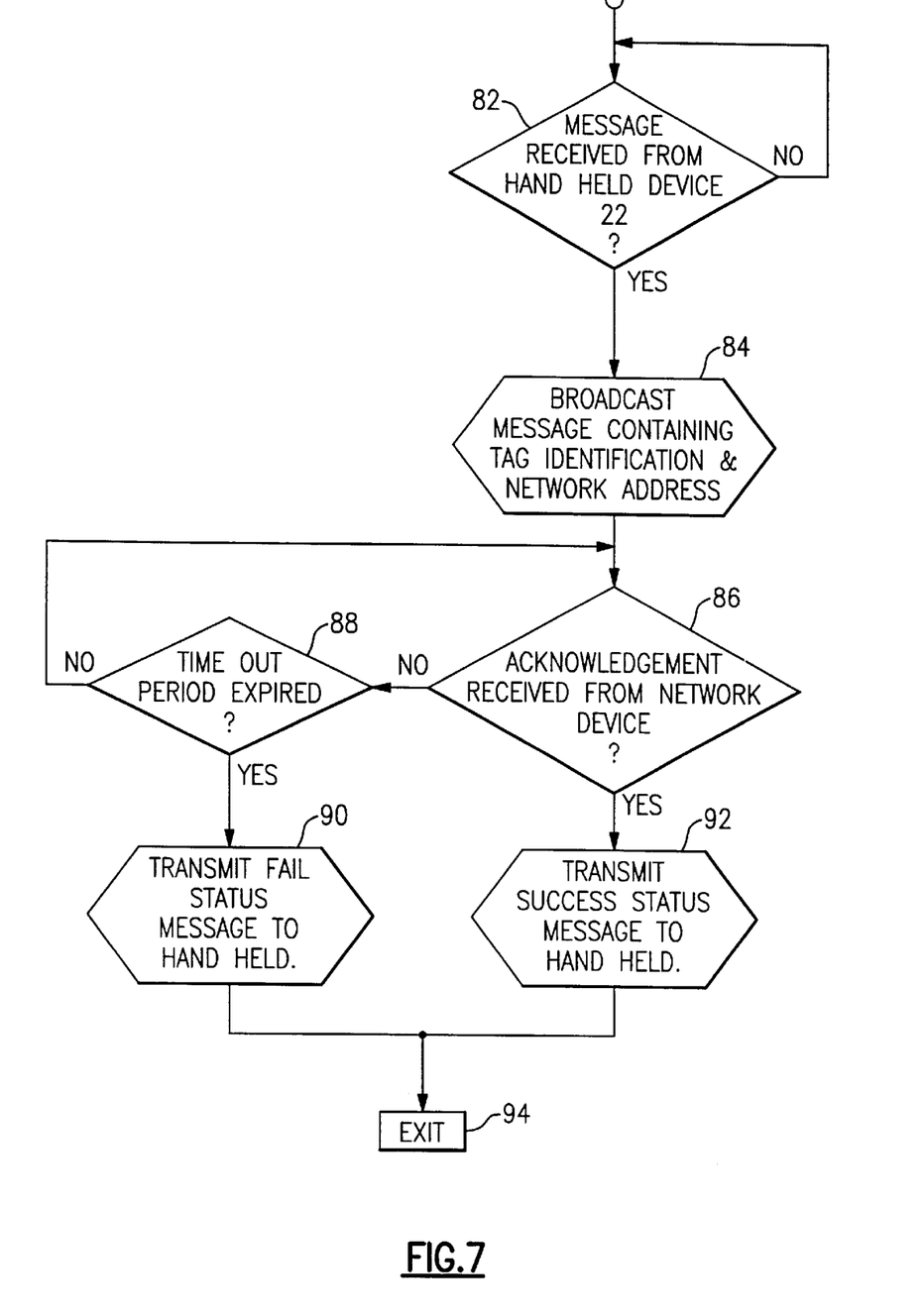
FIG. 7 is a flow chart of the process implemented by processor within the network controller whereby the network address received from the hand held device is assigned to the HVAC network device having the tag identification picked up by the hand held device.

Referring now to FIG. 7, the process implemented by the processor 30 within the network controller in response to receipt of a message containing the tag identification and network address from a hand held device is shown. As has been previously described, the network controller preferably includes an infrared receiver 24 for receiving such messages from the hand held device. The process begins with a step 82 wherein inquiry is made as to whether a message has been received at the receiver. When a message is received, the network controller will proceed to broadcast a message containing the received tag identification and network address from the hand held device. This message is preferably a broadcast message to all HVAC network devices attached to the bus 16. As will be explained in detail hereinafter, the particular HVAC network device attached to the bus 16 having a TAG_ID value matching the tag identification will respond to the broadcast message. The processor 30 within the network controller awaits an acknowledgement from the particular device having the matching TAG_ID value in a step 86. The processor exits to a step 88 in the event that an acknowledgement has not yet occurred. Referring to step 88, the processor will merely look further for receipt of the acknowledgement unless a time period has clocked out for receiving an acknowledgement from the particular device having the matching TAG_ID value. In the event that a period for an acknowledgement has expired, the processor will proceed to a step 90 and transmit a failed status message to the hand held device. Referring again to step 86, in the event that the acknowledgement has been received from a network device attached to the bus 16, then the processor will proceed to step 92 and transmit a success status message via transmitter 25 to the receiver 44 of the hand held device 22. The processor 30 within the network controller will thereafter proceed to exit the configuration mode of FIG. 7 in a step 94.

Figure 8:
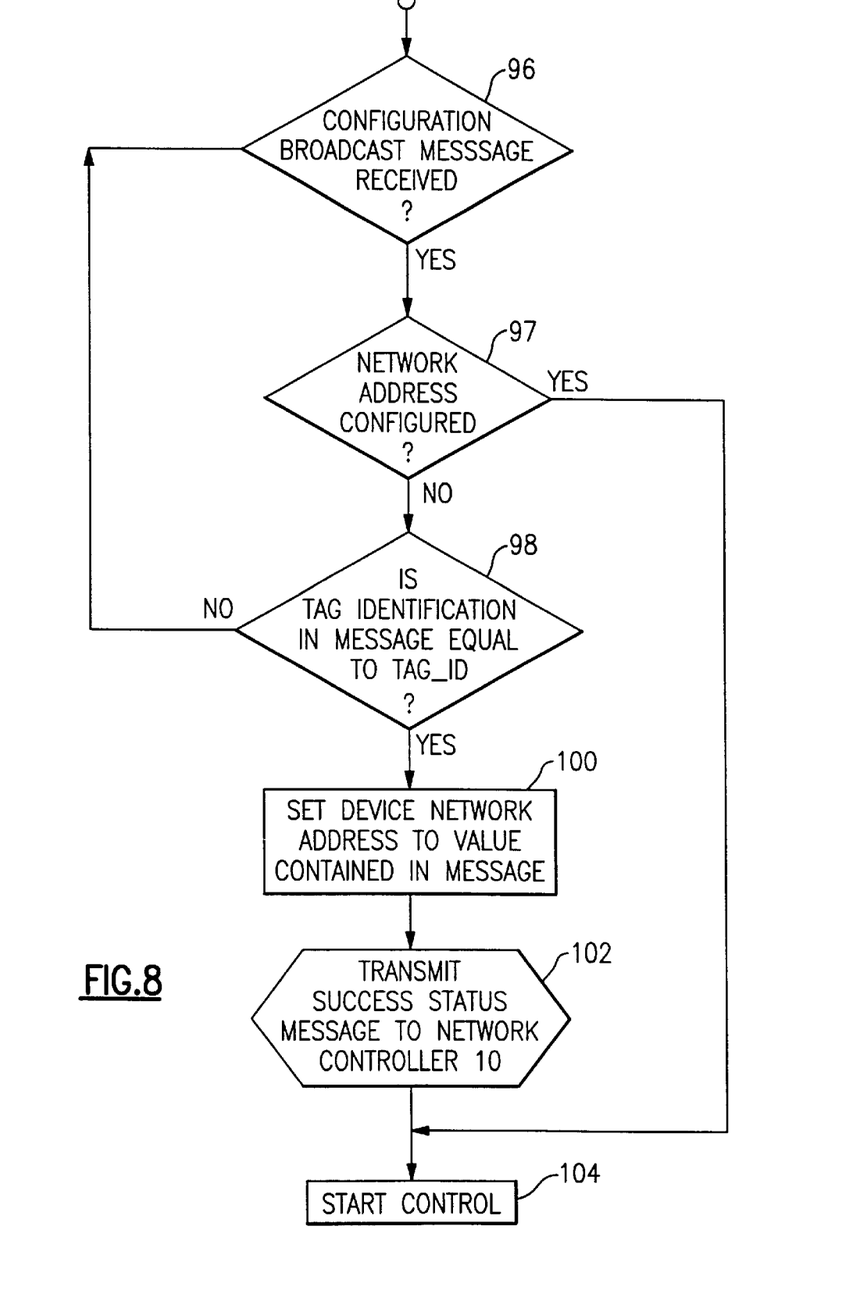
FIG. 8 is a process implemented by the processor within the HVAC network device whereby the assigned network address from the network controller is received and stored in the network device.

Referring now to FIG. 8, the process implemented by an HVAC network device in response to the receipt of a broadcast message from the network controller is shown. The process begins with a step 96 wherein an inquiry is made as to whether a configuration broadcast message has been received by the HVAC device. In the event that a configuration broadcast message is noted as having been transmitted on the bus 16, then the processor 34 within the HVAC device will proceed to a step 97 and inquire as to whether the network address has been previously set or configured. This could be a check of memory to see if any network address has been previously assigned. If no memory address has been assigned, then the processor will proceed to step 98 and inquire as to whether the tag identification in the message is equal to the value of TAG_ID stored in the memory 38. In this regard, it will be remembered that the read tag identification of the RFID tag of a network device is stored in memory 38 in step 54 of FIG. 5 during the initial programming of the HVAC network device. If the tag identification received from the network controller matches the stored value of TAG_ID in memory 38, then the processor proceeds to step 100. The processor in step 100 sets the device network address equal to the network address received from the network controller. The processor 34 thereafter proceeds to transmit a success status message to the network controller 10 in a step 102. The processor thereafter initiates control of any particular HVAC equipment downstream of the HVAC control interface 40 in a step 104.

It is to be appreciated from the above that a series of processes have been disclosed whereby a device to be attached to a communication bus is initially assigned an RFID tag with the identification value contained in the tag being stored in its memory. The device is thereafter assigned a network address through a series of communications first between the RFID tag and a hand held device and thereafter between the hand held device and the network controller and finally between the network controller and the device attached to the bus 16 without an assigned network address.

Alterations, modifications and improvements to these various processes will readily occur to those skilled in the art. For instance, the hand held device could be something that is not necessarily held in ones hand. Accordingly, the foregoing description is by way of example only and the invention is to be limited by the following claims and equivalents thereto.

What is claimed is:

1. A process for assigning network addresses to HVAC network devices within a network having at least one network controller, said process comprising:

providing radio frequency identification (RFID) tags to one or more of the HVAC network devices;

storing tag identifications transmitted by the RFID tags within the one or more HVAC network devices;

reading a tag identification transmitted by an RFID tag associated with one of the HVAC network devices;

transmitting the read tag identification and a network address to be assigned to the HVAC network device to the network controller;

sending a message from the network controller to the HVAC network devices having RFID tags, the message including the tag identification and the assigned network address transmitted to the network controller; and accepting the assigned network address at the HVAC network device having a stored tag identification corresponding to the tag identification in the message from the network controller.

2. The process of claim 1 further comprising the steps of:

accessing a database containing network addresses for the one or more HVAC devices having RFID tags; and identifying the network address for the HVAC network device having the associated RFID tag transmitting the read tag identification in said step of reading a tag identification transmitted by an RFID tag associated with one of the HVAC network devices, whereby the identified network address can be thereafter transmitted with the read tag identification in said step of transmitting the read tag identification and a network address to be assigned to the HVAC network device to the network controller.

3. The process of claim 1 wherein said steps of reading a tag identification transmitted by an RFID tag associated with one of the HVAC network devices and transmitting the read tag identification and a network address to be assigned to the HVAC network device to the network controller are performed by the same device.

4. The process of claim 3 wherein the device is portable so as to be capable of moving from the location of one HVAC network device having an RFID tag associated therewith to another such HVAC network device.

5. The process of claim 4 wherein the portable device is a handheld device having an infrared receiver for reading a tag identification transmitted by an RFID tag associated with one of the HVAC network devices and an infrared transmitter for transmitting the read tag identification and a network address to be assigned to the HVAC network device to the network controller.

6. The process of claim 1 wherein said step of storing tag identifications transmitted by the RFID tags within one or more HVAC network devices comprises the steps of;

reading a tag identification transmitted by an RFID tag associated with a particular HVAC network device; and storing the read tag identification in a memory within the particular HVAC network device.

7. The process of claim 6 wherein said step of accepting the assigned network address at the HVAC network device having a stored tag identification corresponding to the tag identification in the message from the network controller comprises the steps of:

noting when the tag identification stored in the memory within an HVAC network device is the same as the tag identification in the message from the network controller; and storing the assigned network address in the message from the network controller in the memory within the particular HVAC network device having a stored tag identification corresponding to the tag identification in the message from the network controller.

8. The process of claim 7 further comprising the steps of:

transmitting a message to the network controller from the particular HVAC network device having a stored tag identification corresponding to the tag identification in the message from the network controller that the assigned network address has been stored in the memory of the particular HVAC network device.

9. The process of claim 8 wherein said steps of reading a tag identification transmitted by an RFID tag associated with one of the HVAC network devices and transmitting the read tag identification and a network address to be assigned to the HVAC network device to the network controller are performed by the same device.

10. The process of claim 9 further comprising the step of:

transmitting a message from the network controller to the device performing the steps of reading a tag identification transmitted by an RFID tag associated with one of the HVAC network devices and transmitting the read tag identification and a network address to be assigned to the HVAC network device to the network controller, the message from the network controller indicating that the assigned network address has been stored in the memory of the particular HVAC network device, the message being sent in response to receipt of the message from the particular HVAC network device that the assigned network address has been stored in the memory of the particular HVAC network device.

11. A system for assigning network addresses to HVAC network devices connected to a communication bus, said system comprising:

at least one HVAC network device having a radio frequency identification (RFID) tag associated therewith, said HVAC network device having a stored tag identification corresponding to the associated RFID tag;

a network controller for communicating with the HVAC network devices; and a portable device for reading the tag identification transmitted by the RFID tag associated with the at least one HVAC network device, said portable device being operative to transmit the read tag identification and a network address to be assigned to the HVAC network device to the network controller whereby the network controller is thereafter operative to transmit a message containing the read tag identification and assigned network address to at least one HVAC network device.

12. The system of claim 11 wherein the at least one HVAC network device includes a memory within the HVAC network device for storing the tag identification transmitted by the RFID tag associated with the at least one HVAC network device, said HVAC network device furthermore including a processor for storing the assigned network address in the message from the network controller when the tag identification in the message from the network controller corresponds with the tag identification stored in the memory within the network device.

13. The system of claim 12 wherein the portable device is a handheld device having an infrared receiver for reading a tag identification transmitted by an RFID tag associated with one of the HVAC network devices and an infrared transmitter for transmitting the read tag identification and a network address to be assigned to the HVAC network device to the network controller.

14. The system of claim 12 wherein the processor within the HVAC network device is operative to transmit a message to the network controller that the assigned network address has been successfully assigned when the tag identification in the message from the network controller corresponds with the tag identification stored in the memory.

15. The system of claim 14 wherein the network controller includes a processor that is operative to send a signal to the portable device, the signal containing a message that the assigned network address has been successfully assigned, the signal being sent upon receipt of the message from the HVAC network device that the assigned network address has been successfully assigned.

* * * * *